(12) United States Patent
Symons

(10) Patent No.: US 6,406,749 B1
(45) Date of Patent: Jun. 18, 2002

(54) PROCESS FOR PRODUCING A MODIFIED LIGNOCELLULOSIC MATERIAL

(75) Inventor: Michael Windsor Symons, Monument Park (ZA)

(73) Assignee: Windsor Technologies Limited, Nassau (BH)

( * ) Notice: Subject to any disclaimer, the term of this patent is extended or adjusted under 35 U.S.C. 154(b) by 0 days.

(21) Appl. No.: 09/646,412

(22) PCT Filed: Mar. 18, 1999

(86) PCT No.: PCT/GB99/00842

§ 371 (c)(1),
(2), (4) Date: Nov. 13, 2000

(87) PCT Pub. No.: WO99/47320

PCT Pub. Date: Sep. 23, 1999

(30) Foreign Application Priority Data

| Mar. 18, 1998 | (ZA) | ................................................ 98/2276 |
| Aug. 3, 1998 | (ZA) | ................................................ 98/6932 |

(51) Int. Cl.[7] .................................................. B05D 7/06
(52) U.S. Cl. ........................ 427/254; 427/297; 427/351; 427/393; 427/399; 427/408
(58) Field of Search .................................. 427/297, 351, 427/391, 393, 399, 408, 411, 254

(56) References Cited

U.S. PATENT DOCUMENTS

| 4,404,296 A | | 9/1983 | Schaepel | .................... 523/105 |
| 4,624,985 A | * | 11/1986 | Tsutsumi et al. | ............ 427/150 |
| 4,833,116 A | * | 5/1989 | Yamori et al. | ............... 427/152 |
| 5,276,001 A | * | 1/1994 | Tsuchida et al. | ............. 427/152 |
| 5,360,631 A | * | 11/1994 | Strauss | ........................ 144/254 |
| 5,879,600 A | * | 3/1999 | Symons | ...................... 427/496 |
| 5,973,068 A | * | 10/1999 | Yamaya et al. | .............. 524/865 |

FOREIGN PATENT DOCUMENTS

| EP | 152 976 | 8/1985 |

OTHER PUBLICATIONS

Chemical Abstract, vol. 78, No. 14, Apr. 9, 1973, Schorning et I: "New wood–to–wood bonds in chip materials by chemical polyfunctional systems. II Hot pressing with wooden boards an paricles ina weak acid bond system", XP002105945.

\* cited by examiner

*Primary Examiner*—Shrive P. Beck
*Assistant Examiner*—Kirsten A. Crockford
(74) *Attorney, Agent, or Firm*—Pillsbury Winthrop LLP

(57) ABSTRACT

A process of chemically modifying wood by impregnating the wood, under vacuum, with ammonia gas; after removal of residual ammonia, and while under pressure, impregnating the ammonia gas impregnated wood with an impregnating composition containing dicarboxylic or tricarboxylic anhydride, partly or fully saponified polyvinyl alcohol and water. The impregnating composition may further and, preferably, include a water-soluble boron compound, such as sodium borate. In the latter case, the boron is resistant to leaching.

16 Claims, No Drawings

PROCESS FOR PRODUCING A MODIFIED LIGNOCELLULOSIC MATERIAL

This application is the national phase of international application PCT/GB99/00842 filed Mar. 18, 1999 which designated the U.S.

BACKGROUND OF THE INVENTION

This invention relates to a process of preparing a modified lignocellulosic material, such as wood, or wood chips or particles, or other fibrous plant material, and to impregnating compositions for use in the process.

It is well known to modify wood with anhydrides to esterify the cellulose and hemi-cellulose hydroxyl groups in order to minimise swelling when the wood is wetted.

It is also known to modify wood with resins in order to improve mechanical properties such as hardness and abrasion resistance, but also to contribute to stabilisation and improved performance on wetting. Generally, the resins used must be thermoset, but may also be chemicals which propagate a chemical reaction which goes to completion at elevated temperature. Some of the essential requirements for both successful and commercially viable modification of wood are that there should be no binder related toxic volatiles generated, that the level of the modifying chemical added to the wood and the level of resination added to the wood and the relative proportions between them should be infinitely variable and under accurate control, that the carrier solvent or water present must be capable of total removal from the modified matrix, and that the solvent must be non-reactive, inert, preferably have a low boiling point, have a high evaporative rate, and be easily recoverable and preferably non-flammable. It is however undesirable that the impregnating composition is in the solvent medium because of the danger of explosion, the cost of solvent recovery, control of solvent emissions to the atmosphere, the possibility of solvent interference with the chemical reactions, the danger of toxicity, the cost of specialist plant required and the cost of the solvents themselves. In addition, when the composition is in the water phase, the wood or fibres are easier to handle in the post impregnation phase of the process. The modification system must have true latency in the sense that its chemical make-up must not change over an extended period of time. There should be no change in viscosity and any resin, where present, must not prematurely partly polymerise or condense or cross-link.

When wood chips or plant fibres are modified for the purpose of producing a composite board it is an advantage to have a technology that is sufficiently flexible to allow for the continuous production of boards after the impregnating composition has been added to the material, as is the case with conventional particle board. In this case, the chemicals in the impregnating composition are concentrated to allow for a maximum application of up to 25% of impregnating composition to treated material on a weight basis. In a discontinuous process, the chips or fibres are treated with the impregnating composition, the material is thoroughly dried and may then be pressed to form a board at a later time or different place. In other words, it is only when the heat and pressure are applied that the chemical reactions in the composition go to completion to form the board.

An additional problem with lignocellulosic material products is their susceptibility to attack by various organisms such as fungi and insects.

Copper/chrome/arsenic treatments are used in the wood industry as wood preservatives. However, these are now under environmental scrutiny, particularly the chrome and arsenic components.

In addition, it has been known that boron, borax, boric acid, sodium borate and other boron compounds set as wood preservatives, having both fungicidal and termiticidal properties. The fire retardation properties of such boron compounds are an added advantage.

However, the reason for the limited use of boron compounds in wood preservation is the ready solubility of these compounds resulting in their rapid leaching from impregnated wood when exposed to water wetting, or to high humidity conditions. In these circumstances, the boron rapidly migrates to the surface of the treated wood by osmotic pressure as well as capillarity.

There is thus a need for an improved wood treatment process.

SUMMARY OF THE INVENTION

According to a first aspect of the invention there is provided a process of chemically modifying a lignocellulosic material by:

(1) impregnating the lignocellulosic material with an impregnating composition comprising:
 (i) a dicarboxylic anhydride or a tricarboxylic anhydride;
 (ii) a partially or fully hydrolysed polyvinyl alcohol; and
 (iii) water.

The impregnating composition preferably includes one or more of:
 (iv) a water soluble boron compound;
 (v) a compound which acts as an ammonia donor on heating;
 (vi) a high boiling point tar acid; and
 (vii) a formaldehyde donor or a precursor of formaldehyde.

The lignocellulosic material, when in particle or fibre form, may also have added thereto a thermosetting resin in finely divided dry powder form.

The process of the invention preferably includes the step, prior to step (1) of: impregnating the lignocellulosic material with ammonia gas.

The process, when the lignocellulosic material is solid wood, preferably includes the steps of:
prior to step (1):
 (a) placing the wood in a suitable container such as a pressure cylinder and subjecting the wood to a vacuum;
 (b) optionally
  (i) introducing into the container an amount of ammonia gas to impregnate the wood;
  (ii) removing all of the residual ammonia as by releasing the vacuum and expelling the residual ammonia gas from the container; and
  (iii) subjecting the ammonia gas impregnated wood to a vacuum;
in step (1):
 (c) introducing the impregnating composition into the container;
 (d) impregnating the wood with the impregnating composition by applying pressure, for example hydraulic or pneumatic pressure;
after step (1):
 (e) removing the impregnating composition from the container;
 (f) removing free water from the impregnated wood; and (g) optionally heating the wood to cause the chemical modification of the wood to go to completion.

The process, when the lignocellulosic material is wood chips or plant fibres, preferably includes the steps of:

prior to step (1):

(A) placing the wood chips or plant fibres into a suitable mixer;

in step (1):

(B) adding the impregnating composition to the wood chips or plant fibres in the mixer with mixing;

(C) optionally adding a thermosetting resin in finely divided dry powder form to the wood chips or plant fibres in the mixer with mixing;

after step (1):

(D) removing the water from the treated wood chips or plant fibres; and (E) optionally heating the treated wood chips or plant fibres to cause the chemical modification of the lignocellulosic material to go to completion.

According to a second aspect of the invention there is provided an impregnating composition for chemically modifying a lignocellulosic material, the impregnating composition comprising:

(i) a dicarboxylic anhydride or a tricarboxylic anhydride;

(ii) a partially or fully hydrolysed polyvinyl alcohol; and (iii) water.

DESCRIPTION OF EMBODIMENTS

The invention is a process of modifying a lignocellulosic material by impregnating it with an impregnating composition.

By a lignocellulosic material there is meant any plant material emanating from the photosynthetic phenomenon.

The lignocellulosic material may be wood, or wood chips or particles, paper, paper waste or pulp, or other fibrous plant material. However, the process of the invention is of particular application to solid wood products, such as wood in sawn, sliced, peeled or veneer form, or paper sheeting.

The lignocellulosic material is chemically modified by impregnating the lignocellulosic material with an impregnating composition comprising a dicarboxylic anhydride or a tricarboxylic anhydride, a partially or fully hydrolysed polyvinyl alcohol, various optional components, and water, as the solvent.

The dicarboxylic anhydride may be selected from the group consisting of maleic anhydride, phthalic anhydride, succinic anhydride and tetrahydrophthalic anhydride, and the tricarboxylic anhydride may be trimellitic anhydride. The preferred anhydride is maleic anhydride.

The impregnating composition preferably contains from 0.25% to 5% inclusive, more preferably from 0.5% to 3% inclusive of the anhydride by mass of the impregnating composition. As the lignocellulosic material takes up from 10% to 200% inclusive, more usually from 25% to 150% inclusive of the impregnating composition by mass of the lignocellulosic material itself before the removal of the water, depending upon the nature of the lignocellulosic material, after the removal of the water the amount of the anhydride in the lignocellulosic material thus ranges from 0.25% to 10% inclusive by mass of the lignocellulosic material.

The reaction between the anhydride and the lignocellulosic material at elevated temperature in the absence of water is an esterification reaction yielding as an example, lignocellulosic maleate or phthalate or succinate with a residue of water which is removed.

Other anhydrides such as proprionic and butyric anhydride may be esterified to wood or other lignocellulosic material. The result of the reaction between the anhydride and the cellulose and hemi-celluloses of the wood is effectively a lignocellulosic polyester. In addition, oligomers are formed by polymerisation and polycondensation of the anhydride which are linked firmly to the wood or other lignocellulosic material matrix through chemical bonds in addition to ester linkages. The result is carboxyl containing esterified wood or other lignocellulosic material. In the case of maleic anhydride, the double bond opens allowing crosslinking.

Another essential function of the anhydride is to esterify to the polyvinyl alcohol.

The second component of the impregnating composition is a partially or fully hydrolysed polyvinyl alcohol.

An example of a suitably partially hydrolysed polyvinyl alcohol is Mowiol 4/88 by Clariant, with a typical viscosity at 20° C. of 4 mPa.s. (DIN 53015), a degree of hydrolysis mol % of 87.7, an ester number in milligrams of KOH per gram of 140, and a residual acetyl content percentage by weight of 10.7, or Mowiol 3/83 with a comparable viscosity of 2.8 Mpa.s., and an ester value of 190 mg of KOH per gram.

An example of a fully hydrolysed polyvinyl alcohol is Mowiol 4/98, viscosity 4 Mpa.s., a degree of hydrolysis of 98.4 mol %, an ester value of 20 mg of KOH per gram, and a residual acetyl content of 1.5%.

The polyvinyl alcohol is fully soluble in water. Once the water is removed, the polyvinyl alcohol esterifies to anhydride which reaction is accelerated by elevated temperatures, and the presence of ammonia, and residual alcohol solubility is minimised by reaction with formaldehyde.

The polyvinyl alcohol has an affinity for celluloses, is a good adhesive and serves to size wood material, particularly in association with anhydrides.

The impregnating composition preferably contains from 0.1% to 12% inclusive, more preferably from 0.5% to 8% inclusive of the polyvinyl alcohol by mass of the impregnating composition.

The third component of the impregnating composition of the invention is water, as a solvent for the other components. Water forms the balance of the impregnating composition.

Water as a solvent has the advantages that it is non-toxic, environmentally friendly, and suitable to existing plants in many countries where wood is impregnated in the water medium.

The fourth optional component of the impregnating composition of the invention is a water soluble boron compound such as for example sodium borate, boric acid, borax or the like.

The impregnating composition preferably contains from 0.25% to 3% inclusive, preferably of from 0.25% to 1.5% inclusive of the boron compound by mass of the impregnating composition.

The fifth optional component of the impregnating composition of the invention is a compound which acts as an ammonia donor on heating, for example hexamethylene tetramine, preferably in an amount of from 0.01% to 1% inclusive of the compound by mass of the impregnating composition.

The purpose of the use of such a compound, and in particular hexamethylene tetramine, which is also a formaldehyde donor, is to produce formaldehyde to propagate the insolubility of any residual polyvinyl alcohol by the formation of a polyvinyl acetal resin. In addition, it complexes the esterification reaction between the anhydride and the polyvinyl alcohol. Further, hexamethylene tetramine produces ammonia which reacts with the polyvinyl alcohol, anhydride and water soluble boron compound to form a ligand or relatively insoluble complex, thereby "locking" the boron into the lignocellulosic material matrix, minimising its movement to the surface by osmosis on subsequent wetting, but retaining its fungicidal and termiticidal properties which may otherwise be negated by precipitation.

The sixth optional component of the impregnating composition of the invention is a high boiling point tar acid derived from coal, particularly derived from the water stream in the distillation elastification of coal.

The acids may preferably be initially dissolved in methanol to assist miscibility in the formulation.

During the distillation of coal, there is produced a gas, tars and a water stream containing high boiling point tar acids and pitches. It is this tar acid which is useful in the impregnating composition of the invention.

It is important that the high boiling point tar acid is partially or completely dissolved in the solvent in order that impregnation of the lignocellulosic material occurs.

An example of a suitable tar acid is Merisol XHBTA produced by Merichem-Sasol RSA (Proprietary) Limited, which product has a boiling point in the range 210° to 300° C. at atmospheric pressure, and a density of 1.03. This product is only sparingly soluble in water, but readily soluble in the low carbon alcohols and acetates. It has a composition of 20% to 30% ethyl phenols, 40% to 60% xylenols, and 15% high boiling point tar acids.

The impregnating composition preferably contains from 0.01% to 2% inclusive, more preferably from 0.02% to 0.5% inclusive of the tar acid by mass of the impregnating composition.

The function of this component is to impose resistance to the attack of the lignocellulosic material by microorganisms, particularly fungi, or insects, or the like.

The seventh optional component of the impregnating composition of the invention is a formaldehyde donor or a precursor of formaldehyde. Examples include hexamethylene tetramine, methylene glycol, trimethylene glycol and paraformaldehyde.

The impregnating composition preferably contains from 0.05% to 1.5% inclusive, more preferably from 0.1% to 0.6% inclusive of the formaldehyde donor or the precursor thereof by mass of the impregnating composition.

The impregnating composition may also include a dye, a hydrophobic agent and other optional components.

The lignocellulosic material, when it is in particle or fibre form, may also have added thereto a thermosetting resin in finely divided dry powder form, preferably a phenol formaldehyde novolac resin, in an amount of from 1% to 10% inclusive, preferably in an amount of from 2% to 6% inclusive of the resin by mass of the lignocellulosic material. Examples of suitable resins are PRP 602 or SA 891 by Scheunectady of South Africa. In this case, the impregnated particles or fibres, mixed with the resin, may be subjected to suitable conditions of temperature and pressure to form a finished article such as a board.

The first step of the process of the invention is to impregnate the lignocellulosic material with the impregnating composition. Various ways of achieving this are set out above.

Preferably, prior to this impregnation step, the lignocellulosic material, particularly when it is solid wood, is impregnated with ammonia gas. Ammonia is introduced separately into the treatment chamber as a solution after or during the initial vacuum phase of the process, upon which it turns to a gas and immediately penetrates into the cellular matrix of the wood. When the impregnating composition is introduced, the ammonia catalyzes the esterification reactions as well as insolubilising the boron from solution. This use of ammonia gas serves to act in the formation of a ligand or complex to "lock" the boron compound into the lignocellulosic material.

A generalised process for impregnation of a product such as solid wood will now be given.

1) The wood is subjected to a vacuum of 15 kPa for 15 minutes in a treatment chamber;
2) Ammonia solution is introduced into the treatment chamber;
3) The ammonia remains in the treatment chamber for 10 minutes to allow the gas to penetrate into the wood;
4) Surplus ammonia is purged from the treatment chamber with compressed air;
5) The wood is subjected to a vacuum of 15 kPa for 7 minutes;
6) The treatment chamber is flooded with the impregnating composition;
7) The treatment chamber is pressurised to a pressure of 600 kPa for 20 minutes;
8) The impregnating composition is then removed;
9) The wood is dried down to a moisture equilibrium percentage of 9–15% by mass of water; and
10) The wood is heated to 120° C. for 2 hours to drive all the reactions to completion.

Obviously pressures, temperatures and times can be varied.

The result of the process of the invention is that the impregnating composition forms an ester of polyvinyl alcohol with anhydride and with the water soluble boron compound when present to form an insoluble or sparingly soluble preservative complex in the wood.

Examples of the invention will now be given.

EXAMPLE 1

A preservative solution for the treatment of wood is produced from the following composition:

Polyvinyl alcohol Mowiol Grade 4/88 by Clariant—1% by mass
Maleic or phthalic anhydride—1% by mass
A complex of boric acid in sodium borate—1.4% by mass
Hexamethylene tetramine—0.2% by mass
A colour indicator dye—0.02% by mass
Water—balance to 100%

P Radiata boards 25 mm thick rough sawn—152 mm wide and in lengths of 3.5 meters, at moisture equilibrium percentage, are placed in a pressure chamber and subjected to partial vacuum using a liquid ring vacuum pump. After a pressure of 15 Kpa has been maintained in the cylinder for ten minutes, ammonia is introduced into the cylinder to form a saturated gas. The cylinder is now subjected to air pressure of 4 bar for 5 minutes before the exit valves are opened and free ammonia is allowed to exit the cylinder. The charge is now subjected to a further vacuum for ten minutes before the liquid impregnating composition is introduced. It is then subjected to a positive hydraulic pressure of 6 bar for twenty minutes. The impregnating composition is withdrawn from the cylinder, the impregnated timber is withdrawn and allowed to air dry. The white precipitate of boron polyvinyl alcohol/anhydride is noticeable. After dehydration the timber is heated to the decomposition temperature of hexamethylene tetramine when the reactions are driven to completion.

The mass increase of the treated timber is 1.15 grams of liquid composition uptake per gram of dried wood. The total mass increase of the wood after drying back to moisture equilibrium percentage is 3.93%.

A Boron Leaching Test performed on the treated wood is as follows:

Two samples, one treated with a borate/copper sulphate polymer system (Sample 1) and the other treated with a borate/polymer system (Sample 2), were tested.

1 TREATMENT RETENTION

| | | | |
|---|---|---|---|
| 1.1 | Sample No 1 (Pine) | @ | 3 pieces of 220 mm× 70 mm×19 mm and 544 g uptake |
| | | = | 618.9 kg solution/$m^3$ @ 14.446 g b.a.e./kg |
| | | = | 8.94 kg b.a.e./$m^3$ |
| 1.2 | Sample No 2 (Poplar) | @ | 3 pieces of 220 mm× 70 mm×18 mm and 650 g uptake |
| | | = | 781.25 kg solution/$m^3$ @ 14.446 g b.a.e./kg |
| | | = | 11.29 kg b.a.e./$m^3$ |

Note: Sample No 1 contained $CuSO_4 \cdot H_2O$

2 LEACHING TEST

| | | | |
|---|---|---|---|
| 2.1 | Sample No 1 | @ | ±160 mm×67 mm× 18 mm@8.94 kg b.a.e./$m^3$ |
| | | = | 1.726 g b.a.e. content |
| 2.2 | Sample No 2 | @ | ±160 mm×67 mm× 17.5 mm@ 11.29 kg b.a.e./m3 |
| | | = | 2.116 g b.a.e. content |
| 2.3 | Experimental | | |

Each test sample was vacuum impregnated (15 minutes full vacuum) in 328.5 ml cold water and left submerged for 24 hours.

The water was subsequently analysed by wet filtration to determine the amount of boric acid equivalent (b.a.e.) leached.

2.4 Results

| Sample No. | Sample Mass Before | Sample Mass After | Leach Water Volume* | Filtration Result | B.a.e. Leached Mass | B.a.e. Leached Of Total |
|---|---|---|---|---|---|---|
| 1 | 41.3 g | 81.5 g | 0.2883 l | 2.72 g | 0.784 g | 45.4% |
| 2 | 54.7 g | 93.6 g | 0.2896 l | 0.93 g/l | 0.269 g | 12.7% |

*Total volume of water (i.e. 328.5 ml) less volume absorbed.

The control samples showed average leach percentages of 86%.

It is believed that the presence of copper sulphate in Sample 1 increased the leaching of boron.

EXAMPLE NO. 2

The Production of Particle Board

1. Wood chips or plant fibres are put into a suitable mixer, mixing is commenced and the following dry powders are added:
   a. Novolac resin code 3337 by Polyresin Products, South Africa, in an amount of 2.5% to the dry wood chips by mass.
   b. Sasol Wax 405F spray dried specification, in an amount of 1% to the dry wood chips by mass.
2. After dry mixing, the impregnating solution is introduced onto the wood chips in the mixer at the rate of 25% of the impregnating composition to the wood chips on a mass basis, while mixing continues. The formulation for the impregnating composition is as follows:

| | |
|---|---|
| A 7.5% solution of Mowiol 4/88 polyvinyl alcohol by Hoechst dissolved in water | 700 kg |
| Ammonia solution | 10 kg |
| Maleic anhydride | 10 kg |
| Melamine formaldehyde, Madurit 815 by Hoechst | 10 kg |

3. The wood chips are dried in the mixer to 10% moisture level or less. The finely divided small dry particles of resin and wax now adhere to the wood chips reliably.
4. The wood chips are now laid up either on caul plates or on a moving belt and are then subjected to a pressure of 45 kg/$cm^2$ at a temperature of 200° C. for 6 to 8 seconds per mm thickness, to produce a composite board.

What is claimed is:

1. A process for chemically modifying wood, comprising
   (a) placing the wood in a container under vacuum;
   (b) (i) introducing ammonia gas into the container to impregnate the wood;
       (ii) releasing the vacuum to remove residual ammonia and removing the residual ammonia from the container; and
       (iii) subjecting the ammonia gas impregnated wood to a vacuum;
   (c) impregnating the wood from step (b) with an impregnating composition comprising:
       (i) dicarboxylic anhydride or tricarboxylic anhydride;
       (ii) partially or fully hydrolyzed polyvinyl alcohol; and
       (iii) water;
       while applying pressure thereto;
   (d) removing residual impregnating composition;
   (e) removing water from the impregnated wood; and, optionally,
   (f) heating the wood to cause chemical modification of the wood to go to completion.

2. A process according to claim 1, wherein the impregnating composition further comprises one or more of:
   (iv) water-soluble boron compound;
   (v) heat-activated ammonia donating compound;
   (vi) high boiling point tar acid;
   (vii) formaldehyde donor or precursor of formaldehyde.

3. A process according to claim 1, wherein the dicarboxylic anhydride or tricarboxylic anhydride is selected from the group consisting of maleic anhydride, phthalic anhydride, succinic anhydride, tetrahydrophthalic anhydride, and trimellitic anhydride.

4. A process according to claim 1, wherein the impregnating composition contains from 0.25% to 5% of (i) said anhydride, based on the total mass of the impregnating composition.

5. A process according to claim 1, wherein the impregnating composition contains the polyvinyl alcohol (ii) in an amount of from 0.1 to 12%, based on the total mass of the impregnating composition.

6. A process according to claim 1, wherein the impregnating composition further comprises a boron compound selected from the group consisting of sodium borate, boric acid and borax.

7. A process according to claim 1, wherein the impregnating composition further comprises from 0.25 to 3% of water-soluble boron compound, based on the total mass of the impregnating composition.

8. A process according to claim 1, wherein the impregnating composition further comprises heat-activated ammonia-donating compound.

9. A process according to claim 8, wherein the heat-activated ammonia-donating compound is hexamethylene tetramine.

10. A process according to claim 9, wherein the impregnating composition contains from 0.01 to 1% of hexamethylene tetramine, based on the total mass of the impregnating composition.

11. A process according to claim 1, wherein the impregnating composition further comprises high boiling point tar acid.

12. A process according to claim 11, wherein the impregnating composition contains from 0.01 to 2% of high boiling tar acid, based on the total mass of the impregnating composition.

13. A process according to claim 1, wherein the impregnating composition further comprises formaldehyde donor or precursor of formaldehyde.

14. A process according to claim 13, wherein the amount of formaldehyde donor or precursor is from 0.05 to 1.5%, based on the total mass of the impregnating composition.

15. A process according to claim 14, wherein the formaldehyde donor or formaldehyde precursor is hexamethylene tetramine, methylene glycol, trimethylene glycol or paraformaldehyde.

16. A process according to claim 1, wherein the impregnating composition comprises (i) from 0.25 to 5% of said dicarboxylic or tricarboxylic anhydride; (ii) from 0.1 to 12% of said polyvinyl alcohol; and from 0.25 to 3% of water-soluble boron compound, each based on the total mass of the impregnating composition.

* * * * *